United States Patent
Huang et al.

(10) Patent No.: US 10,838,890 B2
(45) Date of Patent: Nov. 17, 2020

(54) ACCELERATION RESOURCE PROCESSING METHOD AND APPARATUS, AND NETWORK FUNCTIONS VIRTUALIZATION SYSTEM

(71) Applicant: HUAWEI TECHNOLOGIES CO., LTD., Shenzhen (CN)

(72) Inventors: Baojun Huang, Dongguan (CN); Ming Kang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/234,607

(22) Filed: Dec. 28, 2018

(65) Prior Publication Data

US 2019/0129874 A1 May 2, 2019

Related U.S. Application Data

(63) Continuation of application No. PCT/CN2017/087236, filed on Jun. 6, 2017.

(30) Foreign Application Priority Data

Jul. 4, 2016 (CN) .......................... 2016 1 0522240

(51) Int. Cl.
G06F 13/20 (2006.01)
H04L 29/08 (2006.01)
(Continued)

(52) U.S. Cl.
CPC .......... *G06F 13/20* (2013.01); *G06F 9/45558* (2013.01); *G06F 9/50* (2013.01);
(Continued)

(58) Field of Classification Search
None
See application file for complete search history.

(56) References Cited

U.S. PATENT DOCUMENTS 8,176,487 B2 * 5/2012 Armstrong .......... G06F 12/1475
718/1
9,904,975 B2 * 2/2018 Wilt .......................... G06T 1/20
(Continued)

FOREIGN PATENT DOCUMENTS

CN 104951353 A 9/2015
CN 105159753 A 12/2015
(Continued)

OTHER PUBLICATIONS

ETSI GS NFV 002 V1.2.1 (Dec. 2014), Network Functions Virtualisation (NFV); Architectural Framework, 21 pages.
(Continued)

*Primary Examiner* — Henry Tsai
*Assistant Examiner* — Aurangzeb Hassan
(74) *Attorney, Agent, or Firm* — Kilpatrick Townsend & Stockton LLP

(57) ABSTRACT

The present invention provides an acceleration resource processing method and apparatus, and a network functions virtualization system. The method includes: receiving an acceleration resource request of a service, where the acceleration resource request includes an attribute parameter of an acceleration resource and a service acceleration resource scheduling policy, and the service acceleration resource scheduling policy is determined based on a service requirement of the service; and determining the acceleration resource of the service based on the attribute parameter of the acceleration resource and the service acceleration resource scheduling policy. According to this method, the acceleration resource is selected according to the service acceleration resource scheduling policy, so that a specific requirement such as latency sensitivity of a service can be met, thereby reducing a latency service and improving service performance.

17 Claims, 9 Drawing Sheets

(51) Int. Cl.
*G06F 9/50* (2006.01)
*G06F 9/455* (2018.01)
*H04L 12/911* (2013.01)

(52) U.S. Cl.
CPC ............ *G06F 9/5044* (2013.01); *H04L 29/08* (2013.01); *H04L 47/82* (2013.01); *H04L 67/32* (2013.01); *G06F 2009/45579* (2013.01)

(56) References Cited

U.S. PATENT DOCUMENTS

| | | | |
|---|---|---|---|
| 10,169,065 B1* | 1/2019 | Nye | G06F 9/45558 |
| 10,191,865 B1* | 1/2019 | Machulsky | G06F 13/16 |
| 10,452,570 B1* | 10/2019 | Liguori | G06F 13/105 |
| 2005/0081208 A1 | 4/2005 | Gargya et al. | |
| 2007/0088795 A1* | 4/2007 | Dunbar | H04L 69/16 |
| | | | 709/217 |
| 2009/0037941 A1* | 2/2009 | Armstrong | G06F 12/1475 |
| | | | 719/328 |
| 2011/0295967 A1* | 12/2011 | Wang | G06F 21/602 |
| | | | 709/212 |
| 2012/0284712 A1* | 11/2012 | Nimmagadda | G06F 9/5077 |
| | | | 718/1 |
| 2015/0169376 A1 | 6/2015 | Chang et al. | |
| 2015/0180730 A1 | 6/2015 | Felstaine et al. | |
| 2015/0220354 A1* | 8/2015 | Nair | G06F 13/28 |
| | | | 710/301 |
| 2015/0242227 A1* | 8/2015 | Nair | G06F 21/60 |
| | | | 718/1 |
| 2016/0006606 A1* | 1/2016 | Zhu | H04L 41/0803 |
| | | | 370/338 |
| 2016/0050112 A1* | 2/2016 | Crowe | G06F 3/0611 |
| | | | 714/6.3 |
| 2016/0179218 A1* | 6/2016 | Rosenzweig | G01C 21/16 |
| | | | 345/156 |
| 2017/0039089 A1 | 2/2017 | Xia et al. | |
| 2017/0177396 A1* | 6/2017 | Palermo | G06F 9/45558 |
| 2017/0300437 A1 | 10/2017 | Shi et al. | |
| 2018/0205785 A1* | 7/2018 | Caulfield | G06F 9/505 |
| 2018/0210752 A1* | 7/2018 | Tang | G06F 9/455 |
| 2018/0217856 A1 | 8/2018 | Wu et al. | |
| 2018/0246768 A1* | 8/2018 | Palermo | G06F 9/45558 |
| 2020/0026575 A1* | 1/2020 | Guim Bernat | G06F 21/64 |
| 2020/0065271 A1* | 2/2020 | Adiletta | G06F 13/20 |

FOREIGN PATENT DOCUMENTS

| | | |
|---|---|---|
| CN | 105357258 A | 2/2016 |
| CN | 105577801 A | 5/2016 |
| CN | 105656994 A | 6/2016 |
| CN | 105979007 A | 9/2016 |
| JP | 2005108214 A | 4/2005 |

OTHER PUBLICATIONS

XP014287388 ETSI GS NFV-IFA 004 V0.5.0 (Jan. 2016), Network Functions Virtualisation (NFV); NFV Acceleration; Management Aspects Specification, total 26 pages.
XP014275587 NFVIFA(16)000986 Huawei, "IFA002ed221 clause 6 acceleration model modification", ETSI, dated Jun. 14, 2016, total 2 pages.

* cited by examiner

ACCELERATION RESOURCE PROCESSING METHOD AND APPARATUS, AND NETWORK FUNCTIONS VIRTUALIZATION SYSTEM

CROSS-REFERENCE TO RELATED APPLICATIONS

This application is a continuation of International Application No. PCT/CN2017/087236, filed on Jun. 6, 2017, which claims priority to Chinese Patent Application No. 201610522240.7, filed on Jul. 4, 2016, The disclosures of the aforementioned applications are hereby incorporated by reference in their entireties.

TECHNICAL FIELD

The present invention relates to communications technologies, and in particular, to an acceleration resource processing method and apparatus, and a network functions virtualization system.

BACKGROUND

A conventional telecommunication system includes various dedicated hardware devices, and different applications use different hardware devices. With the increase of network scale, the system becomes more complex. This brings many challenges, including development and launch of a new service, operation and maintenance of a system, resource utilization, and the like. To meet these challenges, a Network Functions Virtualization (NFV) technology is proposed. The NFV technology is used to migrate a function of each network element in a telecommunication network from an original dedicated hardware platform to a universal commodity off-the-shelf hardware (COTS) server, and transform each network element used in the telecommunication network into an independent application, so that each network element can be flexibly deployed on a unified infrastructure platform established based on standard devices such as a standard server, a standard memory, and a standard switch. By using the virtualization technology, resource pooling and virtualization are performed on an infrastructure hardware device, and a virtual resource is provided to an upper-layer application to implement decoupling between an application and hardware, so that virtual resources can be quickly added for each application, so as to achieve an objective of expanding a system capacity; or virtual resources can be quickly reduced to achieve an objective of shrinking a system capacity, thereby greatly improving network elasticity.

In an NFV architecture that includes a virtualized network function and an infrastructure layer, the virtualized network function may provide functions of different network elements of an original telecommunication network. Hardware resources of the infrastructure layer, including computing hardware, storage hardware, network hardware, and acceleration hardware, may be used for the virtualized network function. The acceleration hardware is hardware dedicated to acceleration of some complex functions, such as hardware corresponding to encryption/decryption, and media audio and video transcoding.

In the prior art, when an acceleration resource needs to be requested for a service corresponding to a virtualized network function, requirements for the acceleration resource such as an acceleration type and an algorithm type may be carried in the application, and the NFV may select, based on the requirements for the acceleration resource, acceleration hardware that can meet the requirements.

However, using the prior art to select acceleration hardware can meet only a basic acceleration requirement, but cannot ensure that a service obtains an optimal acceleration effect. Consequently, latency, performance, and the like of a service do not reach a standard.

SUMMARY

Embodiments of the present invention provide an acceleration resource processing method and apparatus, and a network functions virtualization system, so as to resolve a problem that latency, performance, and the like of a service do not reach a standard in the prior art.

A first aspect of the embodiments of the present invention provides an acceleration resource processing method, and the method includes:

receiving an acceleration resource request of a service, where the acceleration resource request includes an attribute parameter of an acceleration resource and a service acceleration resource scheduling policy, and the service acceleration resource scheduling policy included in the acceleration resource request is determined based on a service requirement of the service; and determining, after the acceleration resource request of the service is received, the acceleration resource of the service based on the attribute parameter of the acceleration resource and the service acceleration resource scheduling policy. According to this method, the acceleration resource of the service is determined based on both the attribute parameter of the acceleration resource and the service resource scheduling policy, so that the determined acceleration resource can meet actual requirements of a service, thereby ensuring that requirements such as latency and performance of a service can be met.

In a possible design, the acceleration resource of the service may be determined by using the following method:

determining an acceleration resource computing node based on the attribute parameter of the acceleration resource; and determining, from the acceleration resource computing node according to the service acceleration resource scheduling policy, a computing node of the acceleration resource of the service.

In a possible design, before the determining an acceleration resource computing node based on the attribute parameter of the acceleration resource, the method further includes:

obtaining a computing resource computing node based on the acceleration resource request.

In a possible design, the method for determining, from the acceleration resource computing node according to the service acceleration resource scheduling policy, a computing node of the acceleration resource of the service is:

first, determining a current acceleration resource type based on priorities of acceleration resources in the acceleration resource scheduling policy; and then, performing determining on the determined current acceleration resource type, and if the current acceleration resource type is a local virtualization acceleration resource or a local single-root I/O virtualization acceleration resource, determining, from an intersection set of the acceleration resource computing node and the computing resource computing node, the computing node of the acceleration resource of the service, or if the current acceleration resource type is a remote virtualization acceleration resource or a remote single-root I/O virtualization acceleration resource, determining, from a difference set of the acceleration resource computing node and the computing resource computing node, the computing node of the acceleration resource of the service.

In a possible design, the method for determining, from an intersection set of the acceleration resource computing node and the computing resource computing node, the computing node of the acceleration resource of the service is:

determining whether a form attribute of a current computing node in the intersection set of the acceleration resource computing node and the computing resource computing node is consistent with the current acceleration resource type; and if the form attribute is consistent with the current acceleration resource type, using the current computing node as the computing node of the acceleration resource of the service.

In a possible design, the method for determining, from a difference set of the acceleration resource computing node and the computing resource computing node, the computing node of the acceleration resource of the service is:

determining whether a form attribute of a current computing node in the difference set of the acceleration resource computing node and the computing resource computing node is consistent with the current acceleration resource type; and if the form attribute is consistent with the current acceleration resource type, using the current computing node as the computing node of the acceleration resource of the service.

In a possible design, the form attribute is used to identify a deployment form of the computing node, and the deployment form includes virtualization and single-root I/O virtualization.

In a possible design, the method further includes:
receiving acceleration resource attribute information, where the acceleration resource attribute information includes at least the form attribute, and the acceleration resource attribute information is obtained by querying an acceleration resource attribute periodically or during computing node initialization.

In a possible design, a newly added acceleration resource scheduling policy indication may be received, where the newly added acceleration resource scheduling policy indication includes a policy name, an acceleration resource type, and a scheduling priority of each type of acceleration resource; and then the acceleration resource scheduling policy is generated based on the policy name, the acceleration resource type, and the scheduling priority of each type of acceleration resource.

In a possible design, if the resource scheduling request does not include the acceleration resource scheduling policy, a default acceleration resource scheduling policy is determined as the acceleration resource scheduling policy in the resource scheduling request.

In a possible design, scheduling priorities of all types of acceleration resources in the default acceleration resource scheduling policy are as follows in descending order: a local virtualization acceleration resource, a remote virtualization acceleration resource, a local single-root I/O virtualization acceleration resource, and a remote single-root I/O virtualization acceleration resource.

In a possible design, the attribute parameter includes an acceleration type, an algorithm type, and acceleration traffic.

The embodiments of the present invention provides an acceleration resource processing apparatus. The apparatus has functions for implementing the foregoing method. These functions may be implemented by hardware, or may be implemented by hardware executing corresponding software. The hardware or software includes one or more modules corresponding to the foregoing functions.

In a possible design, the apparatus may include a first receiving module and a processing module, where the first receiving module is configured to receive an acceleration resource request of a service, where the acceleration resource request includes an attribute parameter of an acceleration resource and a service acceleration resource scheduling policy, and the service acceleration resource scheduling policy is determined based on a service requirement of the service; and the processing module is configured to determine the acceleration resource of the service based on the attribute parameter of the acceleration resource and the service acceleration resource scheduling policy.

In a possible design, the processing module may include:
a first determining unit, configured to determine an acceleration resource computing node based on the attribute parameter of the acceleration resource; and
a second determining unit, configured to determine, from the acceleration resource computing node according to the service acceleration resource scheduling policy, a computing node of the acceleration resource of the service.

In a possible design, the processing module may further include:
an obtaining unit, configured to obtain a computing resource computing node based on the acceleration resource request.

In a possible design, the second determining unit is specifically configured to:
determine a current acceleration resource type based on priorities of acceleration resources in the acceleration resource scheduling policy; and if the current acceleration resource type is a local virtualization acceleration resource or a local single-root I/O virtualization acceleration resource, determine, from an intersection set of the acceleration resource computing node and the computing resource computing node, the computing node of the acceleration resource of the service; or if the current acceleration resource type is a remote virtualization acceleration resource or a remote single-root I/O virtualization acceleration resource, determine, from a difference set of the acceleration resource computing node and the computing resource computing node, the computing node of the acceleration resource of the service.

In a possible design, the second determining unit is further specifically configured to:
determine whether a form attribute of a current computing node in the intersection set of the acceleration resource computing node and the computing resource computing node is consistent with the current acceleration resource type; and if the form attribute is consistent with the current acceleration resource type, use the current computing node as the computing node of the acceleration resource of the service.

In a possible design, the second determining unit is further specifically configured to:
determine whether a form attribute of a current computing node in the difference set of the acceleration resource computing node and the computing resource computing node is consistent with the current acceleration resource type; and if the form attribute is consistent with the current acceleration resource type, use the current computing node as the computing node of the acceleration resource of the service.

In a possible design, the form attribute is used to identify a deployment form of the computing node, and the deployment form includes virtualization and single-root I/O virtualization.

In a possible design, the apparatus may further include:
a second receiving module, where the module may be configured to receive acceleration resource attribute information, the acceleration resource attribute information includes at least the form attribute, and the acceleration resource attribute information is obtained by querying an acceleration resource attribute periodically or during computing node initialization.

In a possible design, the apparatus may further include:
a third receiving module and a generation module, where the third receiving module may be configured to receive a newly added acceleration resource scheduling policy indication, where the newly added acceleration resource scheduling policy indication includes a policy name, an acceleration resource type, and a scheduling priority of each type of acceleration resource; and the generation module may be configured to generate the acceleration resource scheduling policy based on the policy name, the acceleration resource type, and the scheduling priority of each type of acceleration resource.

In a possible design, the apparatus may further include:
a determining module, configured to: when the resource scheduling request does not include the acceleration resource scheduling policy, determine a default acceleration resource scheduling policy as the acceleration resource scheduling policy in the resource scheduling request.

In a possible design, scheduling priorities of all types of acceleration resources in the default acceleration resource scheduling policy are as follows in descending order: a local virtualization acceleration resource, a remote virtualization acceleration resource, a local single-root I/O virtualization acceleration resource, and a remote single-root I/O virtualization acceleration resource.

In a possible design, the attribute parameter includes an acceleration type, an algorithm type, and acceleration traffic.

A third aspect of the embodiments of the present invention provides an acceleration resource processing apparatus. The apparatus includes a memory and a processor, where the memory is configured to store a program instruction, and the processor is configured to invoke the program instruction in the memory to perform the foregoing method.

In a possible design, the processor may be configured to perform the following method:
receiving an acceleration resource request of a service, where the acceleration resource request includes an attribute parameter of an acceleration resource and a service acceleration resource scheduling policy, and the service acceleration resource scheduling policy is determined based on a service requirement of the service; and determining the acceleration resource of the service based on the attribute parameter of the acceleration resource and the service acceleration resource scheduling policy.

In a possible design, the processor is further configured to:
determine an acceleration resource computing node based on the attribute parameter of the acceleration resource; and
determine, from the acceleration resource computing node according to the service acceleration resource scheduling policy, a computing node of the acceleration resource of the service.

In a possible design, the processor is further configured to:
obtain a computing resource computing node based on the acceleration resource request.

In a possible design, the processor is further configured to:
determine a current acceleration resource type based on priorities of acceleration resources in the acceleration resource scheduling policy; and
if the current acceleration resource type is a local virtualization acceleration resource or a local single-root I/O virtualization acceleration resource, determine, from an intersection set of the acceleration resource computing node and the computing resource computing node, the computing node of the acceleration resource of the service; or
if the current acceleration resource type is a remote virtualization acceleration resource or a remote single-root I/O virtualization acceleration resource, determine, from a difference set of the acceleration resource computing node and the computing resource computing node, the computing node of the acceleration resource of the service.

In a possible design, the processor is further configured to:
determine whether a form attribute of a current computing node in the intersection set of the acceleration resource computing node and the computing resource computing node is consistent with the current acceleration resource type; and if the form attribute is consistent with the current acceleration resource type, use the current computing node as the computing node of the acceleration resource of the service.

In a possible design, the processor is further configured to:
determine whether a form attribute of a current computing node in the difference set of the acceleration resource computing node and the computing resource computing node is consistent with the current acceleration resource type; and if the form attribute is consistent with the current acceleration resource type, use the current computing node as the computing node of the acceleration resource of the service.

In a possible design, the form attribute is used to identify a deployment form of the computing node, and the deployment form includes virtualization and single-root I/O virtualization.

In a possible design, the processor is further configured to:
receive acceleration resource attribute information, where the acceleration resource attribute information includes at least the form attribute, and the acceleration resource attribute information is obtained by querying an acceleration resource attribute periodically or during computing node initialization.

In a possible design, the processor is further configured to:
receive a newly added acceleration resource scheduling policy indication, where the newly added acceleration resource scheduling policy indication includes a policy name, an acceleration resource type, and a scheduling priority of each type of acceleration resource; and
generate the acceleration resource scheduling policy based on the policy name, the acceleration resource type, and the scheduling priority of each type of acceleration resource.

In a possible design, the processor is further configured to:
when the resource scheduling request does not include the acceleration resource scheduling policy, determine a default acceleration resource scheduling policy as the acceleration resource scheduling policy in the resource scheduling request.

In a possible design, scheduling priorities of all types of acceleration resources in the default acceleration resource scheduling policy are as follows in descending order: a local virtualization acceleration resource, a remote virtualization acceleration resource, a local single-root I/O virtualization acceleration resource, and a remote single-root I/O virtualization acceleration resource.

In a possible design, the attribute parameter includes an acceleration type, an algorithm type, and acceleration traffic.

A fourth aspect of the embodiments of the present invention provides a Network Functions Virtualization NFV system, and the NFV system includes the foregoing acceleration resource processing apparatus.

Compared with the prior art, in the solutions provided in the embodiments of the present invention, an acceleration resource is selected based on a service acceleration resource scheduling policy, so that a specific requirement such as latency sensitivity of a service can be met, thereby reducing a service latency and improving service performance.

BRIEF DESCRIPTION OF DRAWINGS

To describe technical solutions in embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
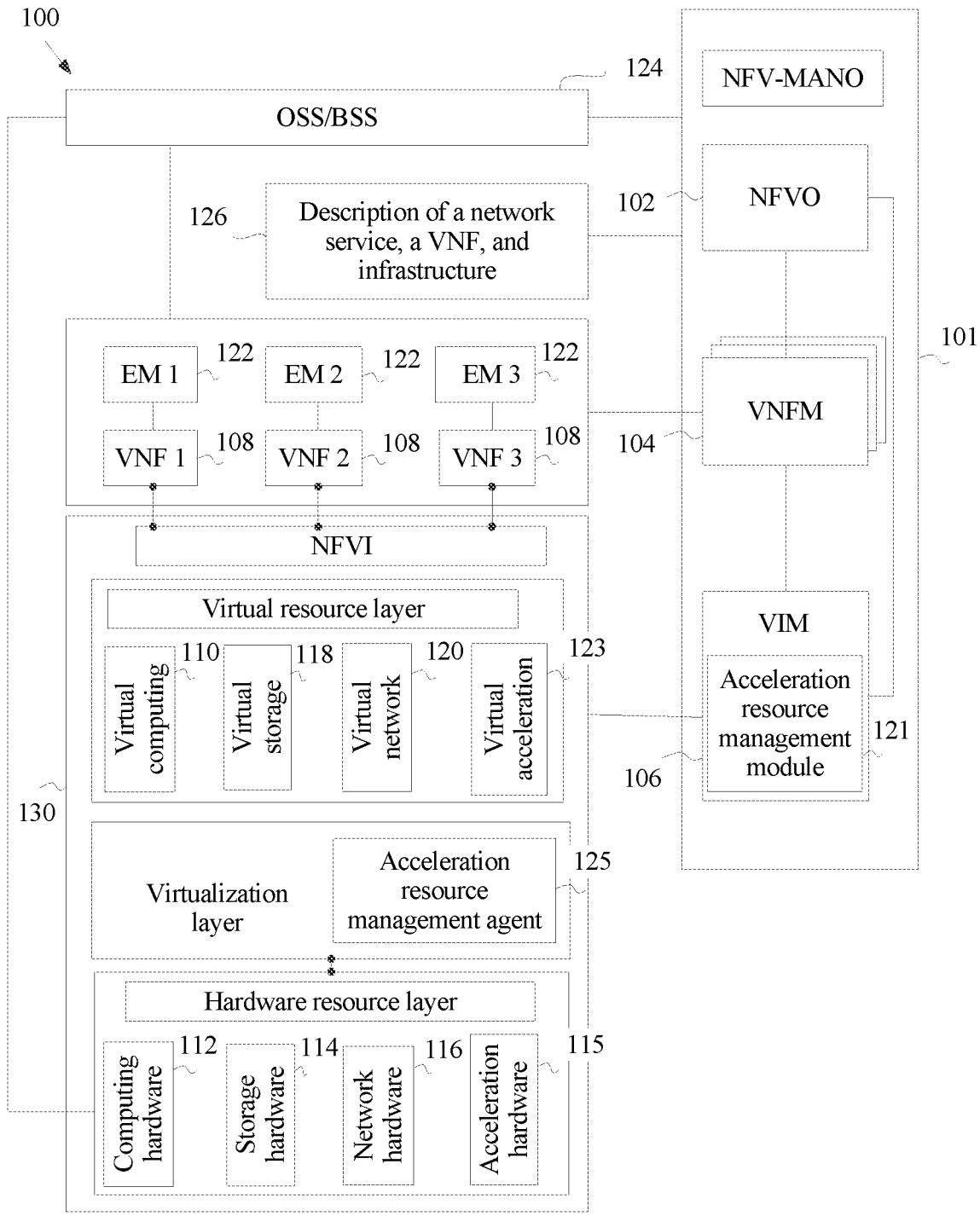
FIG. 1 is an architectural diagram of an NFV system.

FIG. 1 is an architectural diagram of an NFV system. The NFV system is applied to various networks, for example, a data center network, an operator network, or a local area network. As shown in FIG. 1, the NFV system includes an NFV Management and Orchestration (NFV-MANO) system 101, an NFV infrastructure (NFVI) layer 130, a plurality of virtualized network functions (VNF) 108, a plurality of element managers (EM) 122, network service, VNF and infrastructure description (VNF and Infrastructure Description) 126, and an operations support system/business support system (OSS/BSS) 124. The NFVI 130 includes computing hardware 112, storage hardware 114, network hardware 116, acceleration hardware 115, a virtualization layer, virtual computing 110, virtual storage 118, a virtual network 120, and virtual acceleration 123. The NFV management and orchestration system 101 is configured to perform monitoring and management on the virtualized network function 108 and the NFV infrastructure layer 130.

In the foregoing architecture of the NFV system, the NFV management and orchestration system 101 includes: an NFV orchestrator 102, a VNF manager 104, and a virtualized infrastructure manager 106.

The NFV orchestrator 102 may implement a network service on the NFV infrastructure layer 130, or may execute one or more resource-related requests from one or more VNF managers 104, send configuration information to the VNF manager 104, and collect status information of the virtualized network function 108.

The VNF manager (VNF Manager, VNFM for short) 104 may manage one or more virtualized network functions 108.

The virtualized infrastructure manager (Virtualized Infrastructure Manager, VIM for short) 106 may perform a resource management function, for example, a function of managing allocation and operation of an infrastructure resource. The virtualized infrastructure manager 106 and the VNF manager 104 may communicate with each other to perform resource allocation and exchange configuration and status information of a virtualized hardware resource. The VIM includes an acceleration resource management module 121, configured to perform allocation management of an acceleration resource, and the like.

In the foregoing architecture of the NFV system, the NFV infrastructure layer 130 includes the computing hardware 112, the storage hardware 114, the network hardware 116, the acceleration hardware 115, the virtualization layer (Virtualization Layer), the virtual computing 110, the virtual storage 118, the virtual acceleration 123, and the virtual network 120. The acceleration hardware 115, an acceleration resource management agent 125, and the virtual acceleration 123 are related to scheduling of the acceleration resource.

The following describes concepts used in the embodiments of the present invention.

A computing node is referred to as a physical host that provides computing hardware, network hardware, acceleration hardware, and the like in the NFV system architecture, and different computing nodes are different physical hosts.

The acceleration resource is a resource that can provide an acceleration function, and may be the acceleration hardware in the NFV in this embodiment of the present invention.

The computing node may be used to provide the acceleration resource (acceleration hardware), that is, different computing nodes separately provide different acceleration resources (acceleration hardware). Therefore, when the acceleration resource needs to be determined, determining of the acceleration resource may be implemented by determining the computing node that provides the acceleration resource (acceleration hardware).

Figure 2:
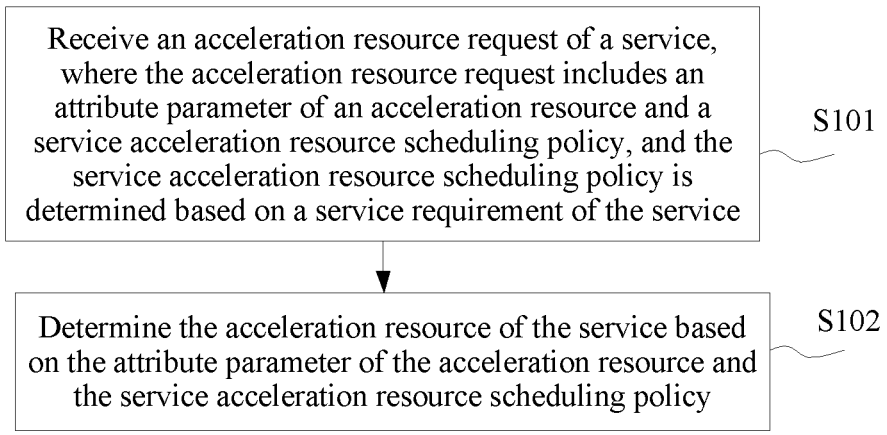
FIG. 2 is a schematic flowchart of Embodiment 1 of an acceleration resource processing method according to an embodiment of the present invention.

FIG. 2 is a schematic flowchart of Embodiment 1 of an acceleration resource processing method according to an embodiment of the present invention. The method is performed by the VIM in the foregoing NFV system. As shown in FIG. 2, the method includes the following steps.

S101. Receive an acceleration resource request for a service, where the acceleration resource request includes an attribute parameter of an acceleration resource and a service acceleration resource scheduling policy, and the service acceleration resource scheduling policy is determined based on a service requirement of the service.

The acceleration resource request or the service may be sent in a specific scenario. For example, when a virtual machine is requested for the service, an acceleration resource is requested for the service based on an actual requirement of the service. For example, if operations such as encryption/decryption and media audio and video transcoding are performed in the service, an acceleration resource needs to be requested for the service. When the service has a relatively high latency requirement, a service acceleration resource scheduling policy corresponding to the service may reflect a requirement that the acceleration resource and a computing resource should be on a same computing node. That is, the acceleration resource scheduling policy is determined based on the actual requirement of the service.

An example in which the acceleration resource is requested for the service when the virtual machine is requested is used. When applying for the virtual machine for the service, a VNFM may send a request for the virtual machine to the VIM. The request for applying for the virtual machine includes an acceleration resource request, and the acceleration resource request includes the attribute parameter of the acceleration resource and the service acceleration resource scheduling policy.

As described above, the VIM includes an acceleration resource management module, configured to manage allocation of the acceleration resource, and the like. In this step, when receiving the acceleration resource request, the VIM receives and processes the attribute parameter of the acceleration resource and the service acceleration resource scheduling policy that are in the acceleration resource request by using the acceleration resource management module.

S102. Determine the acceleration resource of the service based on the attribute parameter of the acceleration resource and the service acceleration resource scheduling policy.

Figure 3:
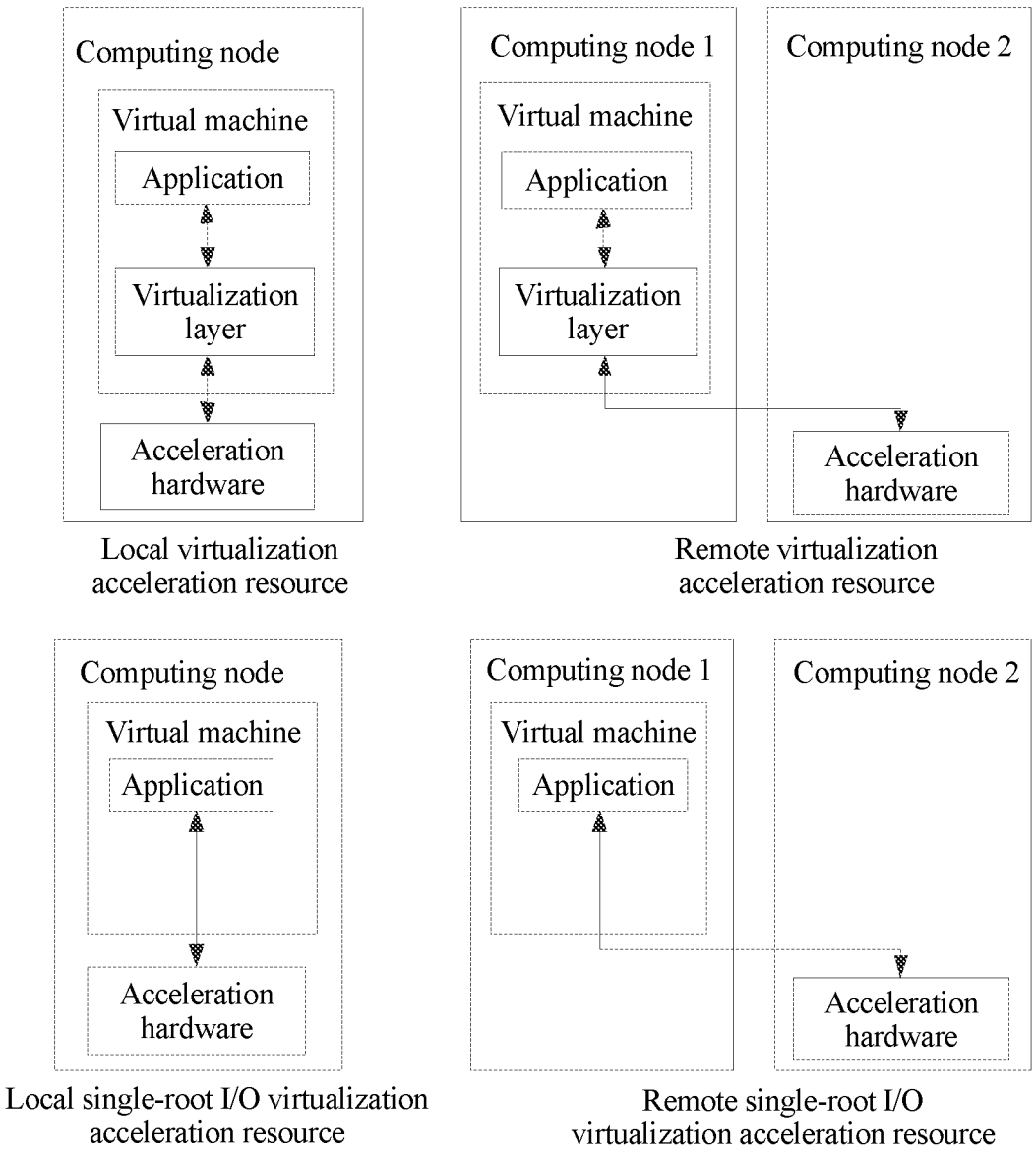
FIG. 3 is a schematic diagram of various types of acceleration resources.

Attribute parameters of the acceleration resource in the acceleration resource request include parameters such as an acceleration type and an algorithm type. The acceleration resource scheduling policy is determined based on the service requirement of the service. The acceleration resource scheduling policy is mainly used to set acceleration resource scheduling priorities. Acceleration resources can include a local virtualization acceleration resource, a remote virtualization acceleration resource, a local single-root I/O virtualization acceleration resource, a remote single-root I/O virtualization acceleration resource and the like. The local virtualization acceleration resource indicates that the acceleration resource and the virtual machine are on a same computing node, and the acceleration resource needs to be connected to the virtual machine through the virtualization layer. The remote virtualization acceleration resource indicates that the acceleration resource and the virtual machine are not on the same computing node, and the acceleration resource needs to be connected to the virtual machine through the virtualization layer. The local single-root I/O virtualization acceleration resource indicates that the acceleration resource and the virtual machine are on the same computing node, and the acceleration resource is directly connected to the virtual machine without passing through the virtualization layer. The remote single-root I/O virtualization acceleration resource indicates that the acceleration resource and the virtual machine are not on the same computing node, and the acceleration resource is directly connected to the virtual machine without passing through the virtualization layer. FIG. 3 is a schematic diagram of various types of acceleration resources.

An acceleration resource scheduling policy is used to set acceleration resource scheduling priorities. When receiving the acceleration resource scheduling policy, an acceleration resource management module may select an acceleration resource based on the acceleration resource scheduling priorities that are set in the acceleration resource scheduling policy. One example is used below for description.

It is assumed that the acceleration resource scheduling priorities in the acceleration resource scheduling policy are: a local single-root I/O virtualization acceleration resource, a local virtualization acceleration resource, a remote single-root I/O virtualization acceleration resource, and a remote virtualization acceleration resource. When receiving the acceleration resource scheduling policy, the acceleration resource management module may first select an acceleration resource that is on a same computing node as a virtual machine and that is directly connected to the virtual machine, and further needs to ensure that these acceleration resources meet the foregoing attribute parameter of the acceleration resource.

In the prior art, an acceleration resource is determined based only on parameters such as a calculation type and an algorithm type, and in this manner, only a basic requirement of service acceleration is provided, but a better acceleration effect however cannot be achieved for the service. For example, if the service acceleration is sensitive to latency, based on the acceleration resource determined in the manner in the prior art, a scenario in which the acceleration resource and the virtual machine are not on the same computing node may occur. When service acceleration is performed by using the acceleration resource, there is network switching between computing nodes, that is, network latency exists. The network latency is usually relatively high when compared with computing processing latency. Consequently, service latency may not reach a standard.

In contrast, in this embodiment, a service acceleration resource scheduling policy is added to an acceleration resource request of the service, and acceleration resource scheduling priorities are set in the policy based on an actual requirement of the service. For example, if the service is sensitive to latency, the local single-root I/O virtualization acceleration resource may be set to be a first choice in the policy. When selecting an acceleration resource, the acceleration resource management module may first select an acceleration resource that is on the same computing node as the virtual machine and that is scheduled in the single-root I/O virtualization manner. An acceleration resource that meets the requirement can ensure that the network switching is not required when service acceleration is performed, so as to avoid latency, thereby meeting a latency requirement of the service. That is, in this embodiment, based on the prior art, the acceleration resource is selected according to the service acceleration resource scheduling policy, so that a specific requirement such as delay sensitivity of the service can be met, thereby improving service latency and performance. If no acceleration resource that meets the foregoing condition, a second type of acceleration resource is selected based on the acceleration resource scheduling priorities set in the acceleration resource scheduling policy.

Figure 4:
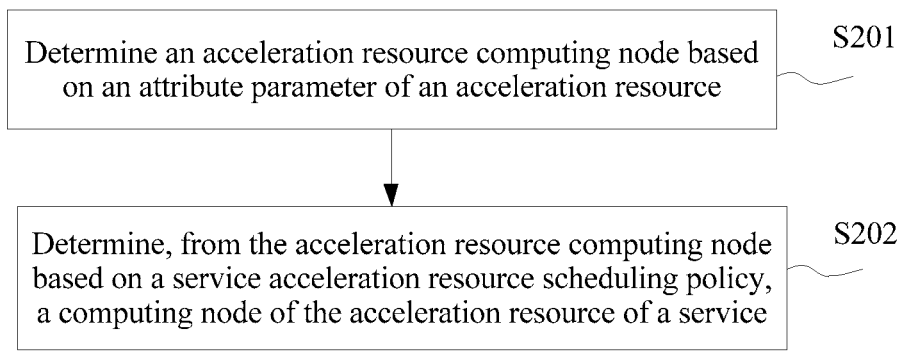
FIG. 4 is a schematic flowchart of Embodiment 2 of an acceleration resource processing method according to an embodiment of the present invention.

Optionally, the acceleration resource priorities may not be set in the service acceleration resource scheduling policy, and only an optimal acceleration resource of the foregoing various acceleration resources is provided based on an actual requirement of the service. Based on the foregoing embodiments, this embodiment relates to a specific method for determining an acceleration resource of a service. FIG. 4 is a schematic flowchart of Embodiment 2 of an acceleration resource processing method according to an embodiment of the present invention. As shown in FIG. 4, the foregoing step S102 specifically includes the following steps.

S201. Determine an acceleration resource computing node based on attribute parameters of the acceleration resource.

As described above, the attribute parameters of the acceleration resource include an acceleration type, an algorithm type, and the like. In addition, the attribute parameter may further include acceleration traffic, and the like. The acceleration type is used to indicate a specific type of the acceleration, for example, encryption/decryption, encoding/decoding, or image processing. The algorithm type is used to identify an algorithm for a specific acceleration type, for example, a specific encryption/decryption algorithm during encryption/decryption. The acceleration traffic represents a requirement for a processing capability of an acceleration resource, for example, an encryption/decryption throughput during encryption/decryption is 5 Gbit/s.

All computing nodes that meet these attribute parameter requirements are determined based on these attribute parameters. It should be noted that a plurality of computing nodes may meet these attribute parameter requirements, and therefore, a set that includes a plurality of computing nodes may be obtained in this step.

S202. Determine, from the acceleration resource computing node based on a service acceleration resource scheduling policy, a computing node of the acceleration resource of a service.

After computing nodes that meet the foregoing attribute parameters are determined, a computing node that meets the service acceleration resource scheduling policy is selected from these computing nodes.

In another embodiment, before the foregoing step S201, the foregoing step S102 further includes:
    obtaining a computing resource computing node based on the acceleration resource request.

Specifically, when a resource is requested for a specific service, a computing resource may need to be requested, and the computing resource is used to provide processing and computing resources, for example, a central processing unit. In addition, the resource requested for the service may further include a storage resource and a network resource. Before the acceleration resource is requested, the computing resource needs to be requested first, that is, a computing node in which the computing resource is located is determined. For example, when applying for the virtual machine for the service, a VNFM may send a request for applying for the virtual machine to a VIM, and the VIM determines, by using a computing resource processing module in the VIM, computing resource computing nodes that meet a service requirement, that is, all computing resources on these computing nodes meet a requirement of the service. A plurality of computing resource computing nodes may be determined, and the determined computing resource computing nodes are arranged based on priorities, that is, a computing node that is selected first is a computing node that can best meet a computing requirement of the service.

Figure 5:
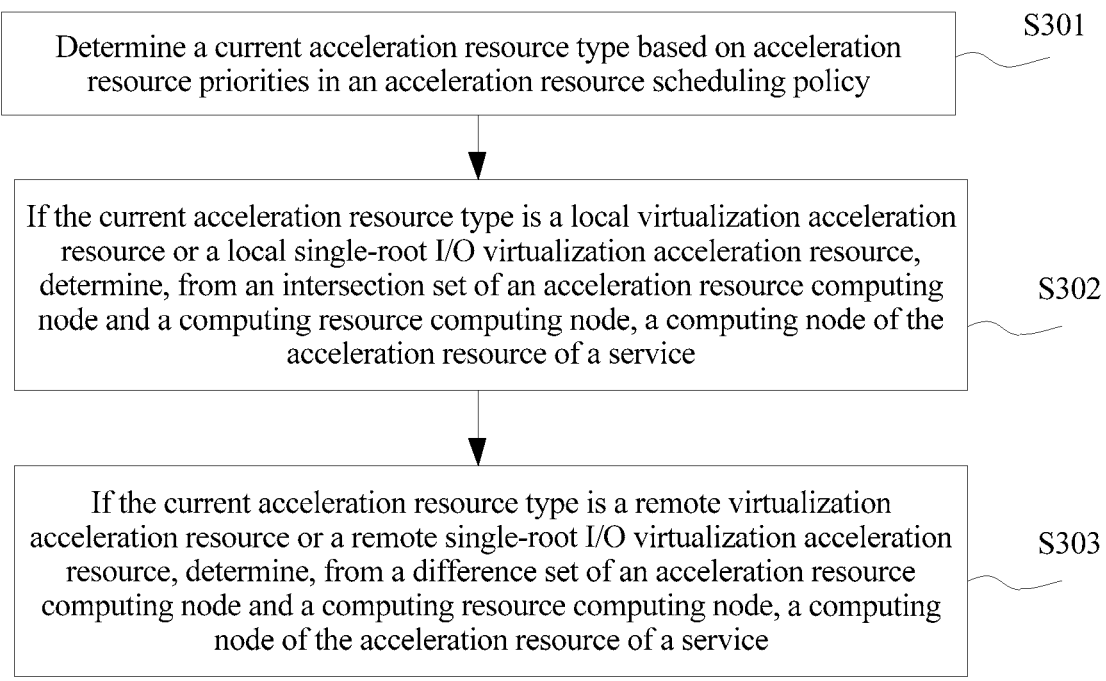
FIG. 5 is a schematic flowchart of Embodiment 3 of an acceleration resource processing method according to an embodiment of the present invention.

Based on the foregoing embodiments, this embodiment relates to a specific method for determining a computing node of an acceleration resource of a service from acceleration resource computing nodes. That is, FIG. 5 is a schematic flowchart of Embodiment 3 of an acceleration resource processing method according to an embodiment of the present invention. As shown in FIG. 5, the foregoing step S202 specifically includes the following steps.

S301. Determine a current acceleration resource type based on acceleration resource priorities in an acceleration resource scheduling policy.

For example, it is assumed that the acceleration resource scheduling priorities in the acceleration resource scheduling policy are: a local single-root I/O virtualization acceleration resource, a local virtualization acceleration resource, a remote single-root I/O virtualization acceleration resource, and a remote virtualization acceleration resource. In this case, first, it is determined that the current acceleration resource type is the local single-root I/O virtualization acceleration resource, that is, the acceleration resource by the service should be on a same computing node as the virtual machine, and the acceleration resource is single-root I/O virtualization.

S302. If the current acceleration resource type is a local virtualization acceleration resource or a local single-root I/O virtualization acceleration resource, determine, from an intersection set of the acceleration resource computing node and a computing resource computing node, the computing node of the acceleration resource of the service.

Specifically, if the current acceleration resource type is the local virtualization acceleration resource or the local single-root I/O virtualization acceleration resource, it indicates that the acceleration resource that is expected to be used by the service should be on a same computing node as the virtual machine. In this case, based on the foregoing determined acceleration resource computing node and computing resource computing node, the intersection set of the two types of computing nodes should be determined. Because the acceleration resource computing node is a computing node that meets an acceleration resource requirement of the service, and the computing resource computing node is a computing node that meets a computing resource requirement of the service, each computing node in the intersection set of the two types of computing nodes meets both the acceleration resource requirement of the service and the computing resource requirement of the service.

For example, if the foregoing determined acceleration resource computing nodes are {a node 1, a node 2, a node 3}, and the determined computing resource computing nodes are {the node 2, the node 3, a node 4}, an intersection set of the two types of computing nodes is {the node 2, the node 3}. That is, the node 2 and the node 3 can meet both the acceleration resource requirement of the service and the computing resource requirement of the service.

S303. If the current acceleration resource type is a remote virtualization acceleration resource or a remote single-root I/O virtualization acceleration resource, determine, from a difference set of the acceleration resource computing node and the computing resource computing node, the computing node of the acceleration resource of the service.

Specifically, if the current acceleration resource type is the remote virtualization acceleration resource or the remote single-root I/O virtualization acceleration resource, it indicates that the acceleration resource that is expected to be used by the service should not be on a same computing node as the virtual machine. In this case, based on the foregoing determined acceleration resource computing node and computing resource computing node, the difference set of the two types of computing nodes should be determined, that is, a computing node that is an acceleration resource computing node, but is not a computing resource computing node.

For example, if the foregoing determined acceleration resource computing nodes are {a node 1, a node 2, a node 3}, and the determined computing resource computing nodes are {the node 2, the node 3, a node 4}, a difference set of the two types of computing nodes is {the node 1}. That is, the node 1 is only an acceleration resource computing node, but is not the computing resource computing node. The difference set of the acceleration resource computing node and the computing resource computing node is determined, so that it is ensured that an obtained acceleration resource and an obtained computing resource (that is, the virtual machine) are not on a same computing node, thereby meeting a requirement in the acceleration resource scheduling policy.

If no computing node that is of the acceleration resource and that meets the requirement is determined by performing the foregoing S301 to S303, S301 to S303 continue to be performed. That is, based on the acceleration resource priorities in the acceleration resource scheduling policy, a next acceleration resource is found and used as a current acceleration resource type, and a computing node of the acceleration resource of the service is determined based on the new current acceleration resource type.

In another embodiment, the computing node has a form attribute. The form attribute may be used to identify a deployment form of the computing node. The deployment form of the computing node includes virtualization and single-root I/O virtualization.

Specifically, when the computing node is deployed, the deployment form may be the virtualization, that is, physical hardware is connected to a virtual resource layer through a virtualization layer; or may be the single-root I/O virtualization, that is, physical hardware is directly connected to a virtual resource layer without passing through a virtualization layer. The form attribute of the computing node means the two deployment forms used to describe the computing node.

Based on the foregoing embodiments, this embodiment relates to a specific method for determining, from an intersection set of the acceleration resource computing node and the computing resource computing node, the computing node of the acceleration resource of the service. That is, the foregoing step S302 is specifically:

determining whether a form attribute of a current computing node in the intersection set of the acceleration resource computing node and the computing resource computing node is consistent with the current acceleration resource type; and if the form attribute is consistent with the current acceleration resource type, using the current computing node as the computing node of the acceleration resource of the service.

Specifically, there may be a plurality of intersection sets of the acceleration resource computing node and the computing resource computing node. Computing nodes in the intersection sets are sequentially determined. Once a form attribute of a computing node is consistent with the current acceleration resource type, determining is no longer performed, and the computing node is directly used as the computing node of the acceleration resource of the service.

For example, it is assumed that an intersection set of the acceleration resource computing node and the computing resource computing node is {a node 2, a node 3, a node 4}, a form attribute of the node 2 is single-root I/O virtualization, a form attribute of the node 3 is virtualization, a form attribute of the node 4 is single-root I/O virtualization, and the current acceleration resource type is local virtualization. In this case, determining is performed first from a first computing node in the intersection set, that is, the node 2. The form attribute of the node 2 is the single-root I/O virtualization, but the current acceleration resource type is the local virtualization; that is, the form attribute of the node 2 is not consistent with the current acceleration resource type. Therefore, a form attribute of the node 3 is determined continuously. The form attribute of the node 3 is the virtualization, and therefore, the form attribute of the node 3 is consistent with the current acceleration resource type. Therefore, the node 3 may be determined as the computing node of the acceleration resource of the service.

Based on the foregoing embodiments, this embodiment relates to a specific method for determining, from a difference set of the acceleration resource computing node and the computing resource computing node, the computing node of the acceleration resource of the service. That is, the foregoing step S303 is specifically:

determining whether a form attribute of a current computing node in the difference set of the acceleration resource computing node and the computing resource computing node is consistent with the current acceleration resource type; and if the form attribute is consistent with the current acceleration resource type, using the current computing node as the computing node of the acceleration resource of the service.

For a specific method, refer to the foregoing embodiment, and details are not described herein again.

Based on the foregoing embodiments, this embodiment relates to a specific method for obtaining an acceleration resource attribute. That is, the foregoing acceleration resource processing method further includes:

receiving acceleration resource attribute information, where the acceleration resource attribute information includes at least the form attribute, and the acceleration resource attribute information is obtained by querying an acceleration resource attribute periodically or during computing node initialization.

Optionally, NFVI may detect a form of the acceleration resource periodically or during the computing node initialization, so as to determine the form attribute, and send the form attribute to an acceleration resource management module. The acceleration resource management module stores the form attribute, and determines the acceleration resource based on the form attribute and the received acceleration resource scheduling policy when the acceleration resource needs to be selected.

Figure 6:
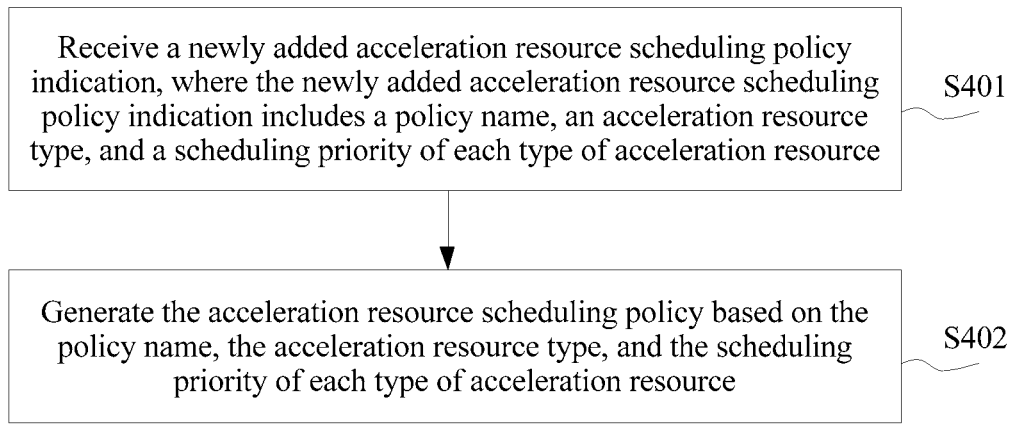
FIG. 6 is a schematic flowchart of Embodiment 4 of an acceleration resource processing method according to an embodiment of the present invention.

Based on the foregoing embodiments, this embodiment relates to a specific method for defining an acceleration resource scheduling policy. That is, FIG. 6 is a schematic flowchart of Embodiment 4 of an acceleration resource processing method according to an embodiment of the present invention. As shown in FIG. 6, before the foregoing step S101, the method further includes the following steps.

S401. Receive a newly added acceleration resource scheduling policy indication, where the newly added acceleration resource scheduling policy indication includes a policy name, an acceleration resource type, and a scheduling priority of each type of acceleration resource.

Specifically, in this embodiment of the present invention, a user enters a parameter of the acceleration resource scheduling policy on a VNFM client or a VIM client. If the parameter is entered on the VNFM client, the VNFM client sends the entered parameter to the VNFM, the VNFM sends the entered parameter to the VIM, and finally, an acceleration resource management module of the VIM stores the entered parameter. If the parameter is entered on the VIM client, the VIM client sends the entered parameter to the VIM, and finally, an acceleration resource management module of the VIM stores the entered parameter.

S402. Generate the acceleration resource scheduling policy based on the policy name, the acceleration resource type, and the scheduling priority of each type of acceleration resource.

Before the acceleration resource management module is stored, a new acceleration resource scheduling policy is generated first based on the parameter information entered by the user.

The following is an example of a representation manner of the acceleration resource scheduling policy, but this embodiment of the present invention is not limited to this representation manner.

"AccResourceSchedulingPolicyType":{
   "Name":"LatencyPriority", //a name of the acceleration resource scheduling policy
   "Sequence":
{"1":"LocalSriovAcc",   "2":   "LocalVirtioAcc",   "3": "RemoteSriovAcc", "4": "RemoteVirti oAcc"}}. //Priorities in the acceleration resource scheduling policy, where 1 represents a highest priority, and so on. There are four types of acceleration resources.

Figure 7:
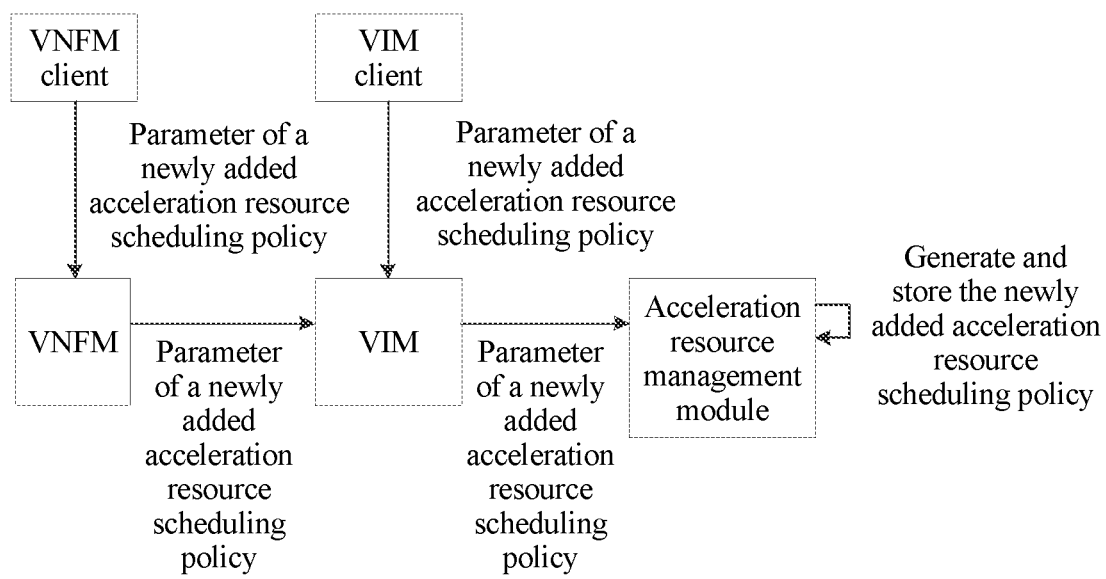
FIG. 7 is a schematic diagram of inter-module interaction for defining an acceleration resource scheduling policy.

FIG. 7 is a schematic diagram of inter-module interaction for defining an acceleration resource scheduling policy. As shown in FIG. 7, a parameter of the acceleration resource scheduling policy may be entered by using a VNFM client or a VIM client, and is finally stored by an acceleration resource management module.

It should be noted that, when receiving the parameter of the acceleration resource scheduling policy, the acceleration resource management module may determine whether a policy corresponding to the acceleration resource management module exists. If the policy does not exist, the resource management module generates a policy and stores the policy; or an error code indicating that the policy exists.

In this embodiment, the acceleration resource scheduling policy may be flexibly defined based on a service requirement, so as to meet requirements of various services.

In another embodiment, after the foregoing step S101, that is, after the virtualized infrastructure manager 106 receives an acceleration resource request of a service, if it is determined that the resource scheduling request does not include the acceleration resource scheduling policy, a default acceleration resource scheduling policy may be determined as the acceleration resource scheduling policy in the resource scheduling request.

In an optional implementation, scheduling priorities of all types of acceleration resources in the default acceleration resource scheduling policy are as follows in descending order: a local virtualization acceleration resource, a remote virtualization acceleration resource, a local single-root I/O virtualization acceleration resource, and a remote single-root I/O virtualization acceleration resource.

Figure 8A:
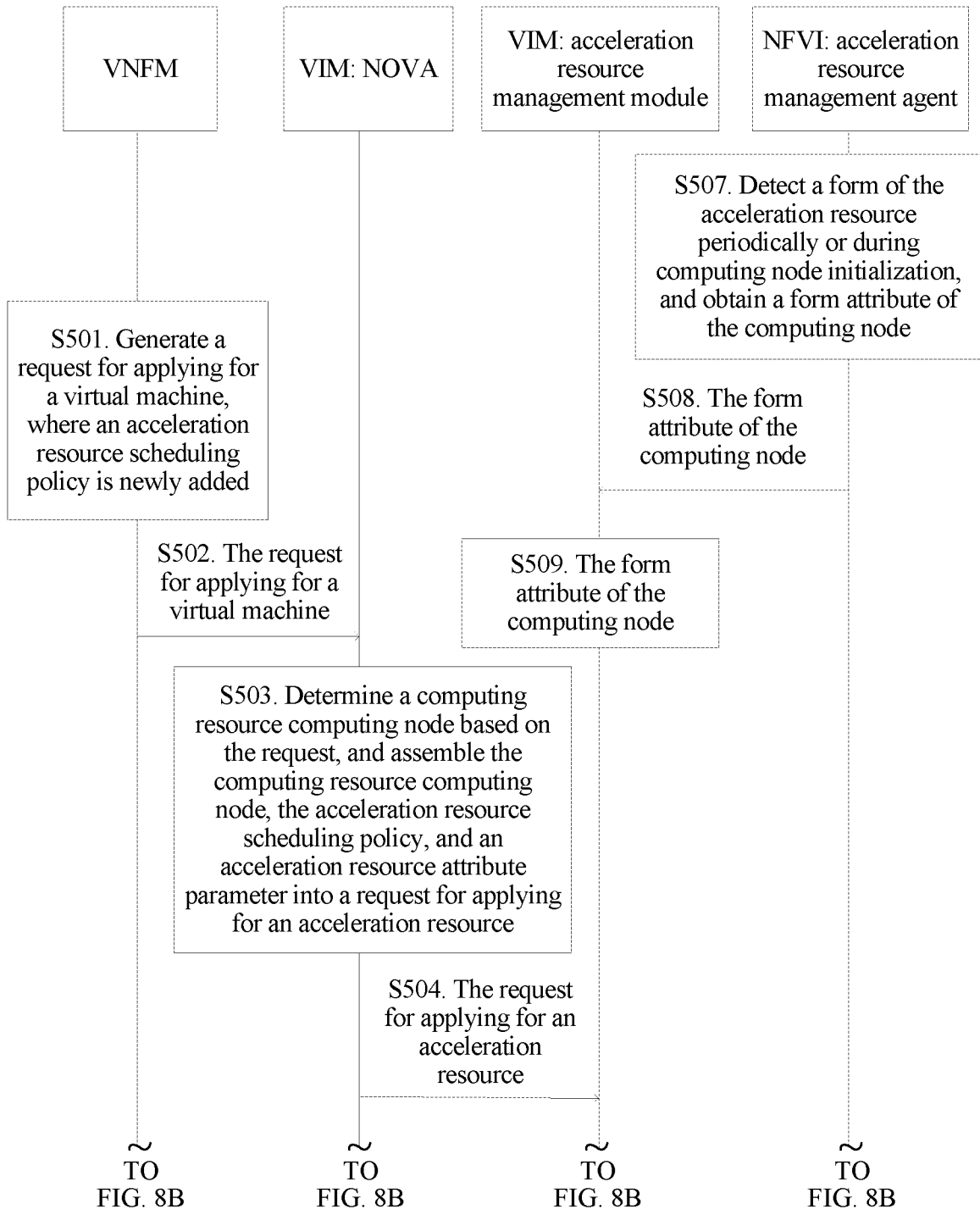
FIG. 8A and FIG. 8B are a complete process of acceleration resource processing.
Figure 8B:
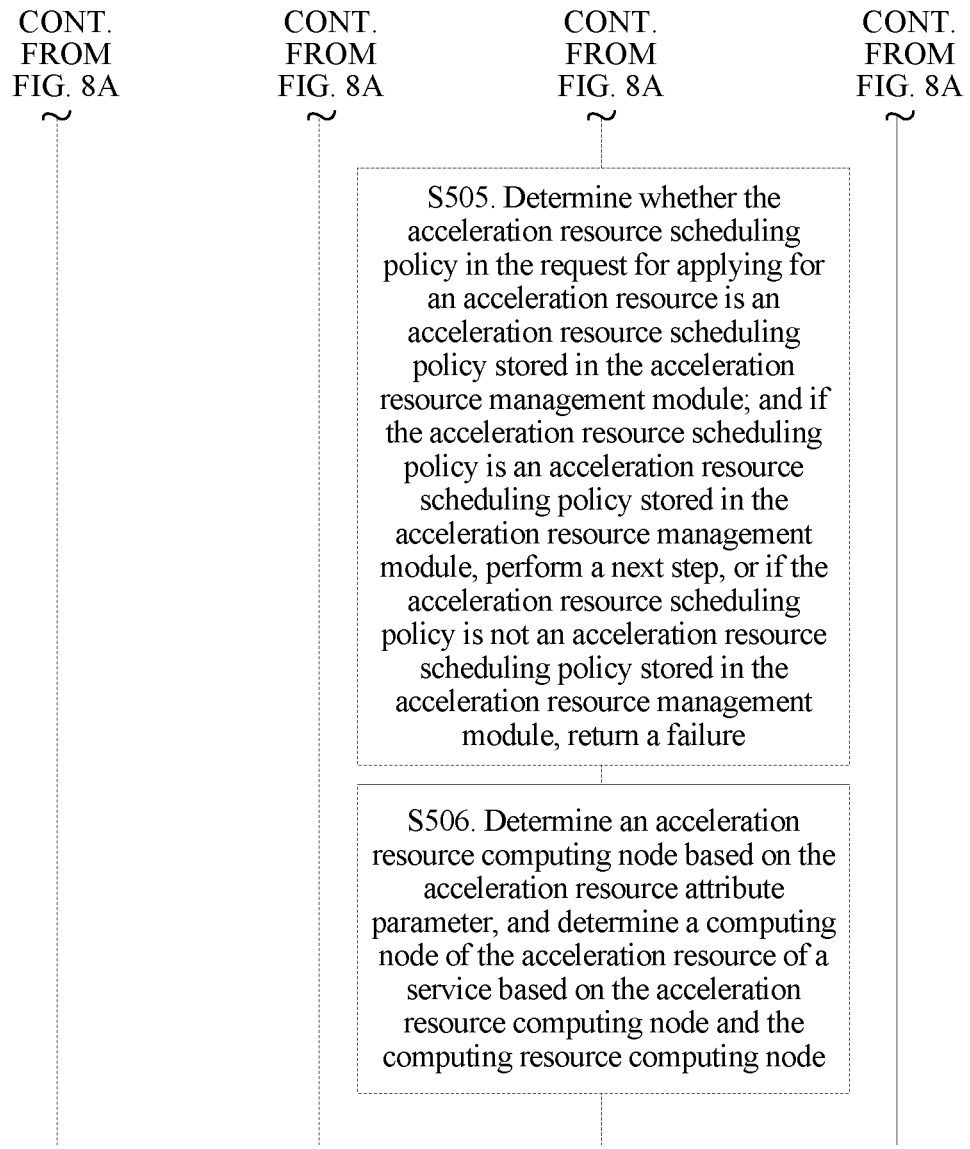

The following uses an example in which a virtual machine is requested for a service to describe a complete process of acceleration resource processing. FIG. 8A and FIG. 8B are a complete process of acceleration resource processing. It should be noted that modules and interaction between the modules in FIG. 8A and FIG. 8B are an optional implementation of this embodiment of the present invention, and cannot be used as a limitation to this embodiment of the present invention. In another embodiment, the same function may be implemented by using another module or fewer modules. As shown in FIG. 8A and FIG. 8B, the process includes the following steps.

S501. A VNFM generates a request for applying for a virtual machine, where an acceleration resource scheduling policy is newly added.

S502. The VNFM sends the request for applying for a virtual machine to a VIM, where the request includes the acceleration resource scheduling policy and an acceleration resource attribute parameter.

S503. A processing module of the VIM determines a computing resource computing node based on the request, and assembles the computing resource computing node, the acceleration resource scheduling policy, and the acceleration resource attribute parameter into a request for applying for an acceleration resource.

S504. The processing module of the VIM sends the request for applying for an acceleration resource to an acceleration resource management module of the VIM.

S505. The acceleration resource management module determines whether the acceleration resource scheduling policy in the request for applying for an acceleration resource is an acceleration resource scheduling policy stored in the acceleration resource management module, and if the acceleration resource scheduling policy is an acceleration resource scheduling policy stored in the acceleration resource management module, performs a next step, or if the acceleration resource scheduling policy is not an acceleration resource scheduling policy stored in the acceleration resource management module, returns a failure.

S506. The acceleration resource management module determines an acceleration resource computing node based on the acceleration resource attribute parameter, and determines a computing node of the acceleration resource of a service based on the acceleration resource computing node and the computing resource computing node.

S507. NFVI detects a form of the acceleration resource periodically or during computing node initialization, and obtains a form attribute of the computing node.

S508. The NFVI sends the form attribute of the computing node to the acceleration resource management module.

S509. The acceleration resource management module stores the received form attribute.

S507 to S509 and S501 to S506 are not performed in a specific sequence, and may be independently performed.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Figure 9:
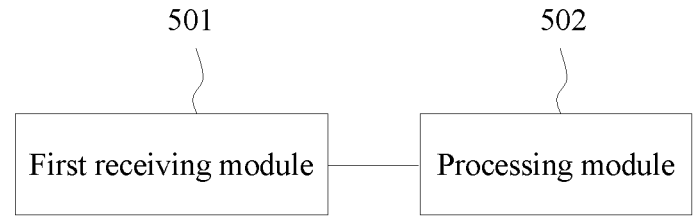
FIG. 9 is a modular structure diagram of Embodiment 1 of an acceleration resource processing apparatus according to an embodiment of the present invention.

FIG. 9 is a modular structure diagram of Embodiment 1 of an acceleration resource processing apparatus according to an embodiment of the present invention. As shown in FIG. 9, the apparatus includes:

a first receiving module 501, configured to receive an acceleration resource request of a service, where the acceleration resource request includes an attribute parameter of an acceleration resource and a service acceleration resource scheduling policy, and the service acceleration resource scheduling policy is determined based on a service requirement of the service; and a processing module 502, configured to determine the acceleration resource of the service based on the attribute parameter of the acceleration resource and the service acceleration resource scheduling policy.

The apparatus is configured to implement the foregoing method embodiments. An implementation principle and a technical effect of the apparatus are similar to those of the method embodiments. Details are not described herein again.

Figure 10:
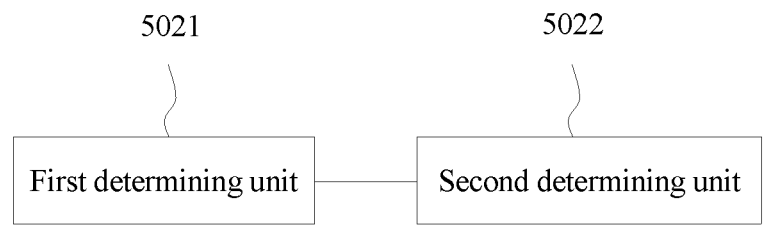
FIG. 10 is a modular structure diagram of Embodiment 2 of an acceleration resource processing apparatus according to an embodiment of the present invention.

FIG. 10 is a modular structure diagram of Embodiment 2 of an acceleration resource processing apparatus according to an embodiment of the present invention. As shown in FIG. 10, the processing module 502 includes:

a first determining unit 5021, configured to determine an acceleration resource computing node based on an attribute parameter of an acceleration resource; and a second determining unit 5022, configured to determine, from the acceleration resource computing node based on a service acceleration resource scheduling policy, a computing node of the acceleration resource of a service.

Figure 11:
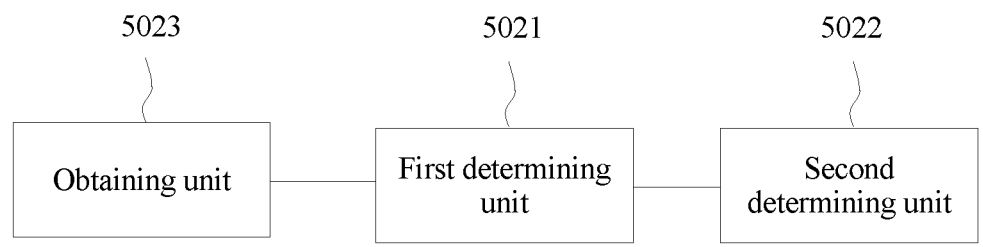
FIG. 11 is a modular structure diagram of Embodiment 3 of an acceleration resource processing apparatus according to an embodiment of the present invention.

FIG. 11 is a modular structure diagram of Embodiment 3 of an acceleration resource processing apparatus according to an embodiment of the present invention. As shown in FIG. 11, the processing module 502 further includes:

an obtaining unit 5023, configured to obtain a computing resource computing node based on an acceleration resource request.

In another embodiment, the second determining unit 5022 is specifically configured to:

determine a current acceleration resource type based on priorities of acceleration resources in the acceleration resource scheduling policy; and if the current acceleration resource type is a local virtualization acceleration resource or a local single-root I/O virtualization acceleration resource, determine, from an intersection set of the acceleration resource computing node and the computing resource computing node, the computing node of the acceleration resource of the service; or if the current acceleration resource type is a remote virtualization acceleration resource or a remote single-root I/O virtualization acceleration resource, determine, from a difference set of the acceleration resource computing node and the computing resource computing node, the computing node of the acceleration resource of the service.

Further, the second determining unit 5022 is further specifically configured to:

determine whether a form attribute of a current computing node in the intersection set of the acceleration resource computing node and the computing resource computing node is consistent with the current acceleration resource type; and if the form attribute is consistent with the current acceleration resource type, use the current computing node as the computing node of the acceleration resource of the service.

Further, the second determining unit 5022 is further specifically configured to:

determine whether a form attribute of a current computing node in the difference set of the acceleration resource computing node and the computing resource computing node is consistent with the current acceleration resource type; and if the form attribute is consistent with the current acceleration resource type, use the current computing node as the computing node of the acceleration resource of the service.

In another embodiment, the form attribute is used to identify a deployment form of the computing node, and the deployment form includes virtualization and single-root I/O virtualization.

Figure 12:
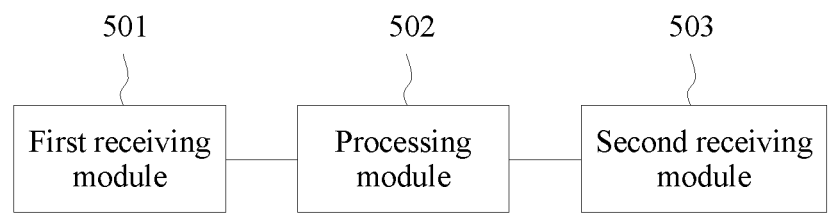
FIG. 12 is a modular structure diagram of Embodiment 4 of an acceleration resource processing apparatus according to an embodiment of the present invention.

FIG. 12 is a modular structure diagram of Embodiment 4 of an acceleration resource processing apparatus according to an embodiment of the present invention. As shown in FIG. 12, based on FIG. 9, the apparatus further includes:

a second receiving module 503, configured to receive acceleration resource attribute information, where the acceleration resource attribute information includes at least the form attribute, and the acceleration resource attribute information is obtained by querying an acceleration resource attribute periodically or during computing node initialization.

Figure 13:
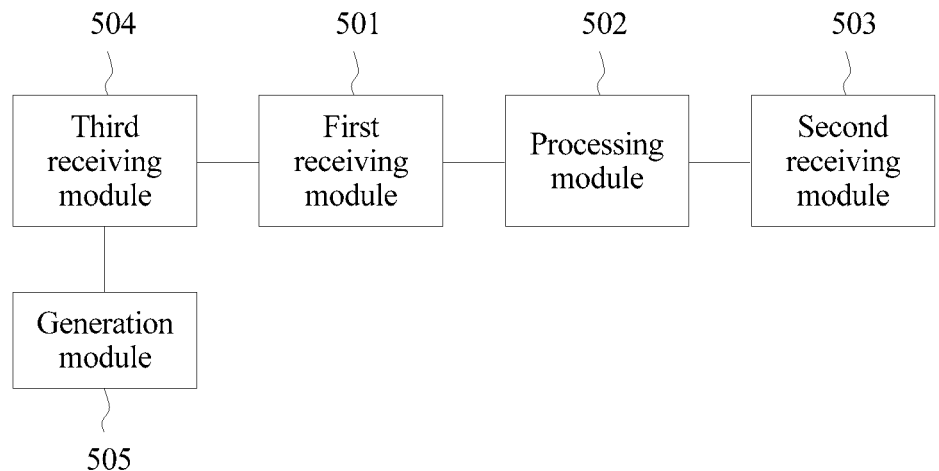
FIG. 13 is a modular structure diagram of Embodiment 5 of an acceleration resource processing apparatus according to an embodiment of the present invention.

FIG. 13 is a modular structure diagram of Embodiment 5 of an acceleration resource processing apparatus according to an embodiment of the present invention. As shown in FIG. 13, based on FIG. 12, the apparatus further includes:

a third receiving module 504, configured to receive a newly added acceleration resource scheduling policy indication, where the newly added acceleration resource scheduling policy indication includes a policy name, an acceleration resource type, and a scheduling priority of each type of acceleration resource; and a generation module 505, configured to generate the acceleration resource scheduling policy based on the policy name, the acceleration resource type, and the scheduling priority of each type of acceleration resource.

Figure 14:
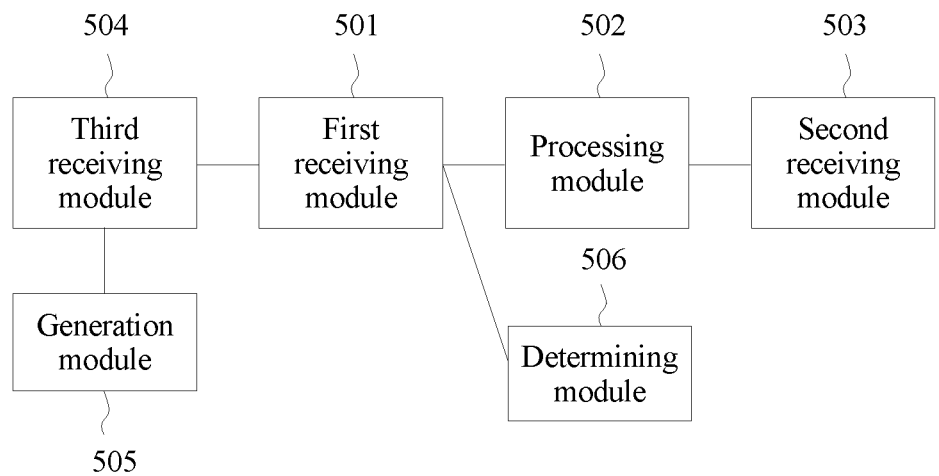
FIG. 14 is a modular structure diagram of Embodiment 6 of an acceleration resource processing apparatus according to an embodiment of the present invention.

FIG. 14 is a modular structure diagram of Embodiment 6 of an acceleration resource processing apparatus according to an embodiment of the present invention. As shown in FIG. 14, based on FIG. 13, the apparatus further includes:

a determining module 506, configured to: when the resource scheduling request does not include the acceleration resource scheduling policy, determine a default acceleration resource scheduling policy as the acceleration resource scheduling policy in the resource scheduling request.

In another embodiment, scheduling priorities of all types of acceleration resources in the default acceleration resource scheduling policy are as follows in descending order: a local virtualization acceleration resource, a remote virtualization acceleration resource, a local single-root I/O virtualization acceleration resource, and a remote single-root I/O virtualization acceleration resource.

In another embodiment, the attribute parameter includes an acceleration type, an algorithm type, and acceleration traffic.

Figure 15:
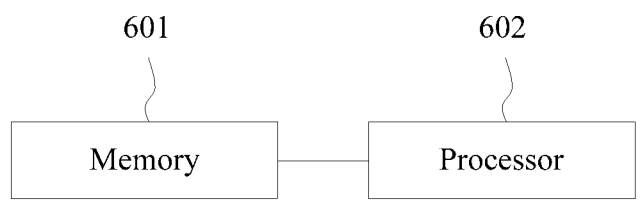
FIG. 15 is a modular structure diagram of Embodiment 7 of an acceleration resource processing apparatus according to an embodiment of the present invention.

FIG. 15 is a modular structure diagram of Embodiment 7 of an acceleration resource processing apparatus according to an embodiment of the present invention. As shown in FIG. 15, the apparatus includes:
a memory 601 and a processor 602.

The memory 601 is configured to store a program instruction, and the processor 602 is configured to invoke the program instruction in the memory 601 to perform the following method:
receiving an acceleration resource request of a service, where the acceleration resource request includes an attribute parameter of an acceleration resource and a service acceleration resource scheduling policy, and the service acceleration resource scheduling policy is determined based on a service requirement of the service; and
determining the acceleration resource of the service based on the attribute parameter of the acceleration resource and the service acceleration resource scheduling policy.

Further, the processor 602 is further configured to:
determine an acceleration resource computing node based on the attribute parameter of the acceleration resource; and
determine, from the acceleration resource computing node according to the service acceleration resource scheduling policy, a computing node of the acceleration resource of the service.

Further, the processor 602 is further configured to:
obtain a computing resource computing node based on the acceleration resource request.

Further, the processor 602 is further configured to:
determine a current acceleration resource type based on priorities of acceleration resources in the acceleration resource scheduling policy; and
if the current acceleration resource type is a local virtualization acceleration resource or a local single-root I/O virtualization acceleration resource, determine, from an intersection set of the acceleration resource computing node and the computing resource computing node, the computing node of the acceleration resource of the service; or
if the current acceleration resource type is a remote virtualization acceleration resource or a remote single-root I/O virtualization acceleration resource, determine, from a difference set of the acceleration resource computing node and the computing resource computing node, the computing node of the acceleration resource of the service.

Further, the processor 602 is further configured to:
determine whether a form attribute of a current computing node in the intersection set of the acceleration resource computing node and the computing resource computing node is consistent with the current acceleration resource type; and if the form attribute is consistent with the current acceleration resource type, use the current computing node as the computing node of the acceleration resource of the service.

Further, the processor 602 is further configured to:
determine whether a form attribute of a current computing node in the difference set of the acceleration resource computing node and the computing resource computing node is consistent with the current acceleration resource type; and if the form attribute is consistent with the current acceleration resource type, use the current computing node as the computing node of the acceleration resource of the service.

In another embodiment, the form attribute is used to identify a deployment form of the computing node, and the deployment form includes virtualization and single-root I/O virtualization.

Further, the processor 602 is further configured to:
receive acceleration resource attribute information, where the acceleration resource attribute information includes at least the form attribute, and the acceleration resource attribute information is obtained by querying an acceleration resource attribute periodically or during computing node initialization.

Further, the processor 602 is further configured to:
receive a newly added acceleration resource scheduling policy indication, where the newly added acceleration resource scheduling policy indication includes a policy name, an acceleration resource type, and a scheduling priority of each type of acceleration resource; and
generate the acceleration resource scheduling policy based on the policy name, the acceleration resource type, and the scheduling priority of each type of acceleration resource.

Further, the processor 602 is further configured to:
when the resource scheduling request does not include the acceleration resource scheduling policy, determine a default acceleration resource scheduling policy as the acceleration resource scheduling policy in the resource scheduling request.

In another embodiment, scheduling priorities of all types of acceleration resources in the default acceleration resource scheduling policy are as follows in descending order: a local virtualization acceleration resource, a remote virtualization acceleration resource, a local single-root I/O virtualization acceleration resource, and a remote single-root I/O virtualization acceleration resource.

In another embodiment, the attribute parameter includes an acceleration type, an algorithm type, and acceleration traffic.

In another embodiment, an embodiment of the present invention further provides an NFV system, and the NFV system includes the foregoing acceleration resource processing apparatus.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An acceleration resource processing method, comprising:
receiving an acceleration resource request requesting acceleration resource for a service, wherein:
the acceleration resource provides an acceleration function for the service;
the acceleration resource comprises at least one of a local virtualization acceleration resource, a remote virtualization acceleration resource, a local single-root I/O virtualization acceleration resource, or a remote single-root I/O virtualization acceleration resources; and the acceleration resource request comprises an attribute parameter of the acceleration resource and a service acceleration resource scheduling policy, the service acceleration resource scheduling policy being determined based on a service requirement of the service, wherein the service acceleration resource scheduling policy is used to set acceleration resource scheduling priorities; and determining the acceleration resource for the service based on the attribute parameter of the acceleration resource and the service acceleration resource scheduling policy, wherein determining the acceleration resource of the service based on the attribute parameter of the acceleration resource and the service acceleration resource scheduling policy comprises:

determining at least one acceleration resource computing node based on the attribute parameter of the acceleration resource, wherein the at least one acceleration resource computing node comprises the acceleration resource; and determining, from the at least one acceleration resource computing node according to the service acceleration resource scheduling policy, an acceleration resource computing node for accelerating the service.

2. The method according to claim 1, wherein before determining the acceleration resource computing node based on the attribute parameter of the acceleration resource, the method comprises:

obtaining a computing resource computing node based on the acceleration resource request, the computing resource computing node comprising a computing resource for implementing the service.

3. The method according to claim 1, wherein determining, from the acceleration resource computing node according to the service acceleration resource scheduling policy, the acceleration resource computing node for accelerating the service comprises:

determining a current acceleration resource type based on priorities of acceleration resources in the acceleration resource scheduling policy; and if the current acceleration resource type is a local virtualization acceleration resource or a local single-root I/O virtualization acceleration resource, determining, from an intersection set of the acceleration resource computing node and the computing resource computing node, the computing node of the acceleration resource of the service; and if the current acceleration resource type is a remote virtualization acceleration resource or a remote single-root I/O virtualization acceleration resource, determining, from a difference set of the acceleration resource computing node and the computing resource computing node, the acceleration resource computing node for accelerating the service.

4. The method according to claim 3, wherein the determining, from an intersection set of the acceleration resource computing node and the computing resource computing node, the acceleration resource computing node for accelerating the service comprises:

determining whether a form attribute of a current computing node in the intersection set of the acceleration resource computing node and the computing resource computing node is consistent with the current acceleration resource type; and if the form attribute is consistent with the current acceleration resource type, using the current computing node as the computing node of the acceleration resource of the service.

5. The method according to claim 4, wherein the form attribute is used to identify a deployment form of the computing node, and the deployment form comprises virtualization and single-root I/O virtualization.

6. The method according to claim 4, wherein the method further comprises:

receiving acceleration resource attribute information, wherein the acceleration resource attribute information comprises at least the form attribute, and the acceleration resource attribute information is obtained by querying an acceleration resource attribute periodically or during computing node initialization.

7. The method according to claim 3, wherein determining, from a difference set of the acceleration resource computing node and the computing resource computing node, the acceleration resource computing node for accelerating the service comprises:

determining whether a form attribute of a current computing node in the difference set of the acceleration resource computing node and the computing resource computing node is consistent with the current acceleration resource type; and if the form attribute is consistent with the current acceleration resource type, using the current computing node as the computing node of the acceleration resource of the service.

8. The method according to claim 1, wherein before the receiving an acceleration resource request of a service, the method further comprises:

receiving a newly added acceleration resource scheduling policy indication, wherein the newly added acceleration resource scheduling policy indication comprises a policy name, an acceleration resource type, and a scheduling priority of each type of acceleration resource; and generating the acceleration resource scheduling policy based on the policy name, the acceleration resource type, and the scheduling priority of each type of acceleration resource.

9. The method according to claim 1, wherein after the receiving an acceleration resource request of a service, the method further comprises:

if a resource scheduling request does not comprise the acceleration resource scheduling policy, determining a default acceleration resource scheduling policy as the acceleration resource scheduling policy in the resource scheduling request.

10. The method according to claim 9, wherein scheduling priorities of all types of acceleration resources in the default acceleration resource scheduling policy are as follows in descending order: a local virtualization acceleration resource, a remote virtualization acceleration resource, a local single-root I/O virtualization acceleration resource, and a remote single-root I/O virtualization acceleration resource.

11. The method according to claim 1, wherein the attribute parameter comprises an acceleration type, an algorithm type, and acceleration traffic.

12. An acceleration resource processing apparatus, comprising:

a transceiver;

one or more processors; and non-transitory computer-readable memory storing a program to be executed by the one or more processors, the program including:

instructions for receiving an acceleration resource request requesting acceleration resource for a service, wherein:

the acceleration resource provides an acceleration function for the service;

the acceleration resource comprises at least one of a local virtualization acceleration resource, a remote virtualization acceleration resource, a local single-root I/O virtualization acceleration resource, or a remote single-root I/O virtualization acceleration resources; and the acceleration resource request comprises an attribute parameter of the acceleration resource and a service acceleration resource scheduling policy, the service acceleration resource scheduling policy being determined based on a service requirement of the service, wherein the service acceleration resource scheduling policy is used to set acceleration resource scheduling priorities, wherein; and instructions for determining the acceleration resource for the service based on the attribute parameter of the acceleration resource and the service acceleration resource scheduling policy, wherein the instructions for determining the acceleration resource for the service based on the attribute parameter of the acceleration resource and the service acceleration resource scheduling policy comprise:

instructions for determining at least one acceleration resource computing node based on the attribute parameter of the acceleration resource, wherein the at least one acceleration resource computing node comprises the acceleration resource; and instructions for determining, from the at least one acceleration resource computing node according to the service acceleration resource scheduling policy, an acceleration resource computing node for accelerating the service.

13. The apparatus according to claim 12, wherein the program further comprises:

instructions for obtaining a computing resource computing node based on the acceleration resource request, the computing resource computing node comprising a computing resource for implementing the service.

14. The apparatus according to claim 13, wherein the program further comprises:

instructions for determining a current acceleration resource type based on priorities of acceleration resources in the acceleration resource scheduling policy;

if the current acceleration resource type is a local virtualization acceleration resource or a local single-root I/O virtualization acceleration resource, determine, from an intersection set of the acceleration resource computing node and the computing resource computing node, the computing node of the acceleration resource of the service; and if the current acceleration resource type is a remote virtualization acceleration resource or a remote single-root I/O virtualization acceleration resource, determine, from a difference set of the acceleration resource computing node and the computing resource computing node, the computing node of the acceleration resource of the service.

15. The apparatus according to claim 14, wherein the program further comprises:

instructions for determining whether a form attribute of a current computing node in the intersection set of the acceleration resource computing node and the computing resource computing node is consistent with the current acceleration resource type; and if the form attribute is consistent with the current acceleration resource type, use the current computing node as the computing node of the acceleration resource of the service.

16. The apparatus according to claim 15, wherein the form attribute is used to identify a deployment form of the computing node, and the deployment form comprises virtualization and single-root I/O virtualization.

17. The apparatus according to claim 14, wherein the program further comprises:

instructions for determining whether a form attribute of a current computing node in the difference set of the acceleration resource computing node and the computing resource computing node is consistent with the current acceleration resource type; and if the form attribute is consistent with the current acceleration resource type, use the current computing node as the computing node of the acceleration resource of the service.

* * * * *